Patented Feb. 6, 1945

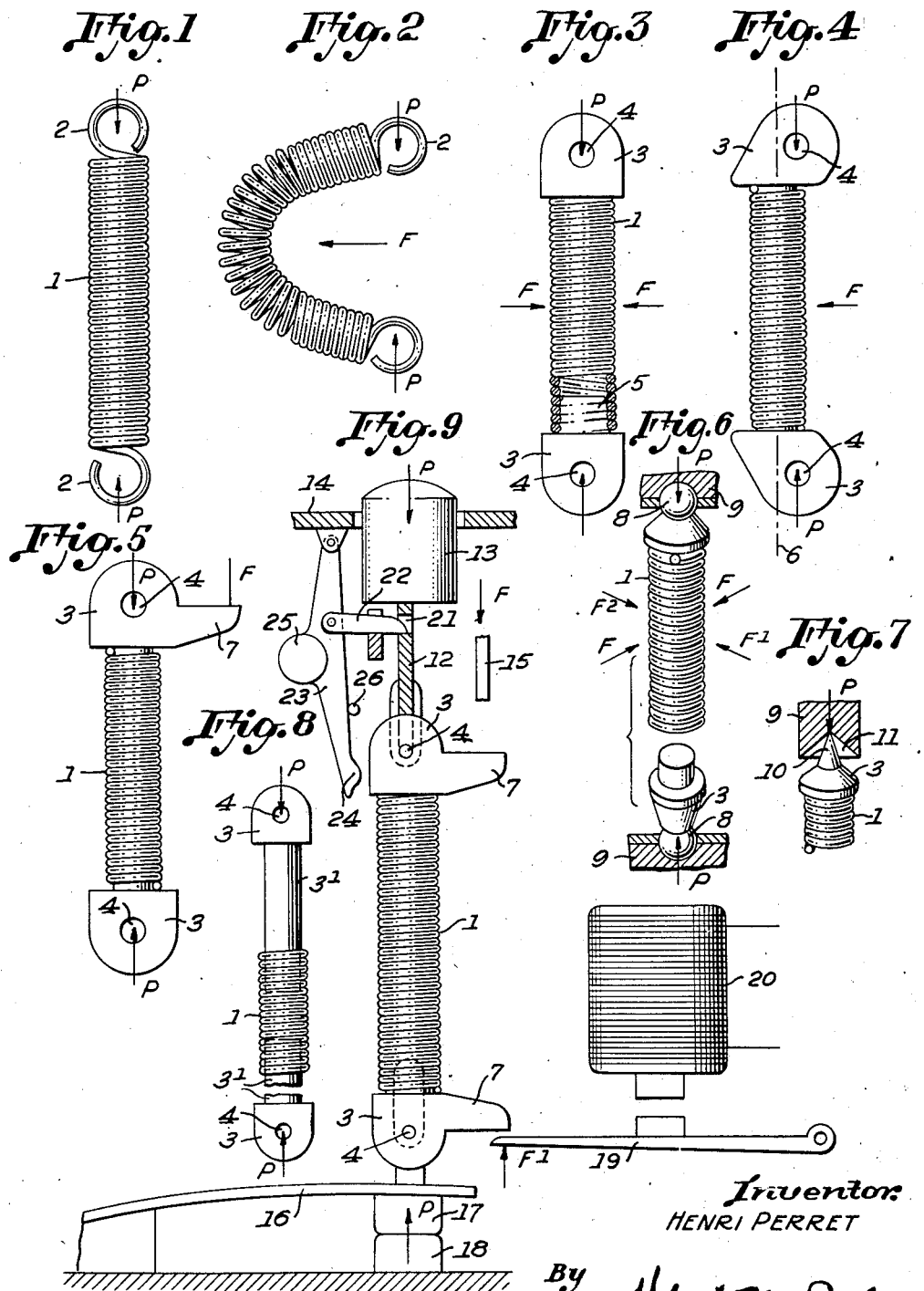

2,368,775

UNITED STATES PATENT OFFICE 2,368,775

TOGGLE MECHANISM

Henri Perret, Zug, Switzerland, assignor to Landis & Gyr, A. G., a corporation of Switzerland Application October 1, 1942, Serial No. 460,360
In Switzerland November 8, 1941

5 Claims. (Cl. 74—581)

This invention relates to toggle mechanism and to such mechanism particularly adaptable to use with electric switches and the like.

Toggle mechanism is in general use in technics and frequently serves the purpose of obtaining a sudden motion, as with the depression of the toggle mechanism a stored energy is instantaneously released. To this effect such mechanism is for instance applied in electro-technics, where it proves highly advantageous in the building of circuit-breakers, e. g. the free tripping of self-acting installation switches.

In practice this mechanism consists of two lever pieces hinged together and an adjustable arresting device which permit depression of the lever pieces slightly beyond the dead point position and frequently of a weak spring facilitating such depression. Hence such toggle levers comprise several parts, i. e. they cannot be considered as a simple mechanism, and are expensive. In addition, such toggle mechanism can only be operatively connected with one release force which can only act in one direction given by the plane in which the lever pieces are folding.

The object of the present invention is to provide a toggle mechanism which is simpler in structure and offers more diversity of release.

Of the drawing:

Fig. 1 shows one form of spring suitable for use in the present invention;

Fig. 2 shows the spring of Fig. 1 in bent condition;

Fig. 3 shows a second form of spring;

Fig. 4 shows a third example of spring;

Fig. 5 shows a fourth example;

Fig. 6 shows a fifth example;

Fig. 7 shows a sixth example;

Fig. 8 is a further showing of a toggle spring assembly; and

Fig. 9 shows toggle mechanism of the present invention adapted to use with an electric switch.

Referring now particularly to Fig. 1 numeral 1 designates a helical spring with directly adjacent windings. The spring is curved on either end to form eyelets 2. These eyelets are supposed to serve as a connection of the spring with the acting points represented by the forces P. Due to its close windings the spring 1 is able to stand a heavy pressure in the direction of these forces. A comparatively small release force F exerted crosswise to the spring 1 about its centre causes, however, the spring, as shown by Fig. 2, to bend or tip, so that the forces P are set free. Upon the disappearing of the forces P the inherent force of the coil tends to restore the spring to its original position.

If for constructional reasons the plain bearing does not suffice as acting points of the forces P in eyelets then, as shown by Fig. 3, special bearing pieces 3 may be provided. In this case the spring 1 itself ends on either side directly on the coil. The bearing pieces 3 have a head fitted with a pin hole 4 and a threaded end 5 with which they engage the ends of the spring 1 (Fig. 3). This simple connection is practically undetachable, because the retrograde turning of the threaded end is then counteracted by the ensuing contraction of the spring 1 in its threads. As indicated, the release force F can act from one or the other side crosswise to the direction of the pin holes 4.

In the embodiment shown in Fig. 3 the pin holes 4 are in alignment with the axis of spring 1. These pin holes 4 may, however, as shown in Fig. 4, also be placed outside the axis line 6 of spring 1, that is to say, preferably in the direction from which the release force F acts. In the latter instance the release force F is decreased, because the spring 1 can be caused more easily to bend than with the pin holes 4 lying in the axis alignment of the spring.

The resistance of the spring 1 to bending can be varied by the last mentioned displacement of the acting points of the forces P as well as by a suitable size of the spring diameter or an appropriate inner pre-tensioning of the spring in its windings, i. e. it can be adapted each time to the respective release force.

According to the embodiment as shown in Fig. 5, the one, i. e. the upper of the bearing pieces 3, which for the rest are built according to Fig. 3, is fitted with a lateral extension or projection 7 on which the release force F acts, that is to say, parallel to the forces P. By a suitable selection of the size of the lever arm, represented by the distance of the point on which F acts on the projection 7 from the pin hole 4, this bending moment of spring 1 can be adapted to the release force.

According to the embodiment of Fig. 6 the bearing pieces 3 are secured in pillow cups 9 by means of spherical parts 8. According to this example the release force F can act crosswise to the spring 1 from any direction, i. e. the toggle lever represented by the spring 1 can be bent in any direction.

As shown by Fig. 6, several release forces F may also act on the spring 1, each being capable of bending it. Such an arrangement may, for instance, be advantageously applied to electric switches, such as installation switches, where e. g.

in addition to the thermal excess current release a short-circuit release or possibly a hand release is present, or on motor protective switches, which, in addition, may possess a zero tension-, fault tension- and remote tripping.

Fig. 7 incorporates a structural modification over the showing of Fig. 6, the bearing pieces 3 with tapered ends 10 being journaled in conical recesses 11 on the pillow bushes 9, whereby the recesses 11 of the tapered ends 10 allow sufficient clearance for their skew adjustment in the pillow bushes 9.

By arranging the spherical or tapered bearing pieces 3 outside the axis of spring 1, the release forces F can be variably chosen as to their magnitude. Thus, for instance, referring to Fig. 6, as a result of a displacement of 8 in the direction of the release force $F^1$ acting on it, this force decreases, whereas the opposite release force $F^2$ increases.

The arrangement according to Fig. 8 shows two rod-shaped bearing pieces 3, whose shaft parts $3^1$ are connected by a short helical spring with closely-arranged windings forming the bending element of the toggle mechanism.

The form of embodiment according to Fig. 9 represents diagrammatically a practical application of the invention in electric switch design. There the toggle lever is shaped similarly to Fig. 5, a helical spring 1 with closely-arranged windings being located between bearing pieces 3 with pin holes 4. Each bearing piece 3 is provided with a lateral projection 7. On pin hole 4 of the upper bearing piece 3 a sliding-plate 12 is pivoted, carrying at its top a push-button 13 extending from the cage 14 of the switch. 15 is a shaft assumed to be seated on an auxiliary push-button (not shown) to be operated outside the cage 14, this auxiliary push-button being subjected to the influence of a spring and acting with the shaft 15 on the projection 7 of the upper bearing piece 3, thus representing a release force F.

By means of the pin hole on the lower bearing piece 3 the movable contact 17 on a spring 16 of the switch is connected to the toggle lever spring 1, the stationary contact being designated with 18. The armature 19 of a magnetic coil 20 is operatively connected to the projection 7 of the lower bearing piece 3.

On the upper part of the switch arrangement a latch is provided comprising a pawl 22 cooperating with a slot 21 in the slide-plate 12 and a lever 23 connected to the said pawl. The lever 23 lies with its free end 24 near the upper bearing piece 3 and a weight 25 tends to keep it bearing against a stop 26.

With closed switch—as shown by Fig. 9—the push-button 13 is depressed, the pawl 22 keeps it arrested with the slide-plate 12, the switch 17, 18 being closed with stretched toggle spring 1 and under tension of spring 16, whereas the parts 15 and 19 are out of action.

If the auxiliary push-button is now depressed by hand, the shaft 15 acts temporarily on the projection 7 of the upper bearing piece 3, thus causing the spring 1 to bend. Thereby not only an instantaneous opening of the contacts 17, 18 is effected, but the latching of the slide-plate 12 is also cleared, as the upper bearing piece 3 striking on lever end 24 causes the lever 23 to swing out, thereby withdrawing the pawl 22 from the slot 21. With the liberation of slide-plate 12, the toggle lever spring 1 resumes its stretched position, so that with opened contacts 17, 18 the switch is again ready for the on-position.

If instead of depressing an auxiliary push-button of 15 a current impulse is imparted to the magnetic coil 20, e. g. from a timing work, its armature 19 acts as release force $F^1$ on the projection 7 of the lower bearing piece 3 and the spring 1 is thus caused to bend.

The last described form of embodiment is assumed to be applied to a power switch merely with reference to the means producing the cutoff. Instead of a medium acting on the switch arbitrarily or depending on time, also other media may be applied, as those dependent on alterations of the conditions of a network or a consumption place, as thermal or short-circuit-release means.

With the foregoing forms of embodiment it is assumed that the windings of the helical spring are arranged closely together. However, it would likewise be possible to employ a helical spring with spaced-out windings, for instance in such a way that by utilizing bearing pieces, parts of these cause the expansion of the acting points, the helical spring then relieved in its windings from these acting points, would merely work as the element provoking the bend. With reference to Fig. 3 this could be effectuated in such a way that the bearing pieces 3 lateral to spring 1 are provided with extensions abutting on their front edges. The windings of the spring 1 would be then slightly spaced apart.

The invention can be utilized wherever a toggle mechanism is required, consequently it is by no means confined to electro-technics. The invention is of the simplest structure conceivable as, fundamentally, only one part is necessary and a toggle lever of this kind not only requires a minimum of space, but is also light in weight, thus ensuring the shortest possible tripping time. Further, such a contrivance offers the possibility of a multisided release.

While I have herein illustrated and described certain preferred embodiments of the present invention, it will be apparent that changes in the construction and operation disclosed may be made without departing either from the spirit of the invention or the scope of the appended claims.

I claim:

1. Toggle-like connecting means for a pair of movable members to move one of said members from a starting position to a moved position when the other said member is moved comprising, in combination, a connecting element between said members and engaging each said member including a flexible portion having flexed and unflexed positions, means for holding said first member in moved position after the other said member has been moved, said holding means being operable by movement of said portion to flexed position to free said first member whereby said first member may return to said starting position.

2. Toggle-like connecting means for a pair of movable members to move one of said members from a position of rest to a moved position when the other said member is moved comprising, in combination, a connecting element between said members and engaging each said member including an elastic portion movable from normal to stretched positions, means engageable with said connecting element for holding said first member in moved position after the other said member has been moved and means for disengaging said engaging means when said elastic portion is in stretched position whereby said first member may return to a position of rest.

3. Toggle-like connecting means for a pair of movable members to move one of said members from a position of rest to a moved position when the other said member is moved comprising, in combination, a connecting element between said members and engaging each said member including a helical spring, the coils of said spring being normally in axial alignment, means engageable with said connecting element for holding said first member in a moved position after the other said member has been moved, means for moving certain of the coils out of axial alignment and means for disengaging said engaging means when said coils are out of axial alignment.

4. The herein described combined toggle-like connection and latch comprising, in combination, a connecting element movable from a position of rest to a moved position and including a helical spring portion, pawl means engageable with said element in said moved position, and means for disengaging said pawl means upon transverse displacement of a portion of said spring whereby the element may return to a position of rest.

5. The herein described combined toggle-like connection and latch comprising, in combination, a connecting element movable from a position of rest to a moved position and including a helical spring portion, pawl means engageable with said element in a moved position to hold said element in said moved position, means for transversely displacing a portion of said coiled spring, and means for disengaging said pawl means upon said displacement of said spring whereby said element may return to the position of rest.

HENRI PERRET.